United States Patent [19]

Knaggs

[11] 4,006,830
[45] Feb. 8, 1977

[54] HAY BALE STACKER

[76] Inventor: Brian Knaggs, General Delivery, Elm Creek, Canada

[22] Filed: Dec. 8, 1975

[21] Appl. No.: 638,377

[52] U.S. Cl. .............................. 214/6 B; 193/31 R
[51] Int. Cl.[2] ........................................ B65G 57/32
[58] Field of Search .............. 214/6 B, 6 DK, 16 B; 198/7 BL, 31 R, 31 AC; 193/31 R, 31 A

[56] References Cited

UNITED STATES PATENTS

| 2,341,475 | 2/1944 | Parra et al. | 193/31 R |
|---|---|---|---|
| 2,588,297 | 3/1952 | Scheppe | 193/31 R |
| 3,889,823 | 6/1975 | Williamson | 214/6 B |
| 3,924,757 | 12/1975 | Meyer | 214/6 B |

Primary Examiner—Robert J. Spar
Assistant Examiner—Ross Weaver
Attorney, Agent, or Firm—Stanley G. Ade

[57] ABSTRACT

Bales are transferred to the hopper at the upper end of the device. Each bale trips a gate in the base of the hopper or bale receiving chamber which deposits the bale onto an inclined transfer chute, the base of which consists of a plurality of chute gates covering chutes leading to the bale forks at the base of the device. The first bale slides downwardly over the gates until the lowermost gate is reached. This gate pivots due to the weight of the bale and deposits it into the furthest chute adapted to receive only one bale. This bale holds this particular gate open at right angles to the remaining gates and the next bale strikes this gate whereupon the gate of the next chute opens due to the weight of the bale and the second bale enters the second chute which is adapted to receive two bales. This second bale slides to the bale fork at the base of this second chute and as it has cleared the second gate, this gate returns to the original position by spring means. The third bale also enters the second chute but holds the gate of the second chute in the open position so that the fourth bale is forced to enter the third chute which holds three bales. The process is repeated until all the chutes are full whereupon the forks trip and deposit the piled bales on the ground.

11 Claims, 7 Drawing Figures 4,006,830

HAY BALE STACKER

BACKGROUND OF THE INVENTION

This invention relates to new and useful improvements in bale stacking machines which are adapted to pile bales in a substantially triangular formation so that they may be deposited upon the ground in this formation for curing and drying purposes.

Many devices exist for receiving bales from a baler and for piling them in this particular formation either in groups of six, 10 or 15 bales, depending upon the design of the machine.

However, all of the conventional machines are extremely involved and require constant attention so that the various machanisms operate correctly and in the desired sequence.

Furthermore conventional bale stacking machines receive the bales and stack them with the so-called string side on top rather than on the outside. This affects the water shedding capabilities of the stacked bales and is undesirable.

The present invention overcomes this disadvantages by providing an extremely simple bale stacking device which is adapted to be secured directly behind a baler in conjunction with a conveyor which conveys bales from the baler to the top of the bale stacking machine.

The device includes a bale receiving chamber which opens as soon as a bale is positioned therein thus depositing the bale upon a sloping bale transfer chute, the bales sliding down this chute by gravity. A plurality of spring loaded hinged gates form the base of this transfer chute, each gate leading into a bale receiving chute which stacks the bales on conventional bale forks situated at the base of the chutes.

The components are so arranged that the bales of the last chute are turned as they enter the chute so that the string side is on the outside thus assisting in the water shedding action.

When the desired number of bales have been entered into the bale receiving chutes, the forks may be tripped either automatically or manually thus depositing the pile of bales on the ground.

The principal object and essence of the invention is therefore to provide a device of the character herewithin described in which the weight of the bales operate various gates and automatically feeds the bales into the desired position within bale receiving chutes.

Another object of the invention is to provide a device of the character herewithin described which is particularly adapted to be secured directly behind a baler and to be drawn thereby.

Yet another object of the invention is to provide a device of the character herewithin described in which the various parts operate automatically and can be constructed with the minimum of moving parts thus reducing maintenance and intricate mechanical adjustments.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 7 is a front elevation of a fifteen bale stack.

In the drawings like characters of reference indicate corresponding parts in the different figures.

DETAILED DESCRIPTION

Reference should first be made to FIG. 7 which shows a conventional stack of bales which, in this case, includes 15 bales numbered 1 through 15 in the order in which they are placed in position within the present device.

Although 15 such bales are shown in this particular stack, nevertheless it will be appreciated that a stack of six bales may be provided consisting of bales 1 through 6 or, alternatively, a stack of 10 bales consisting of bales 1 through 10.

Figure 6:
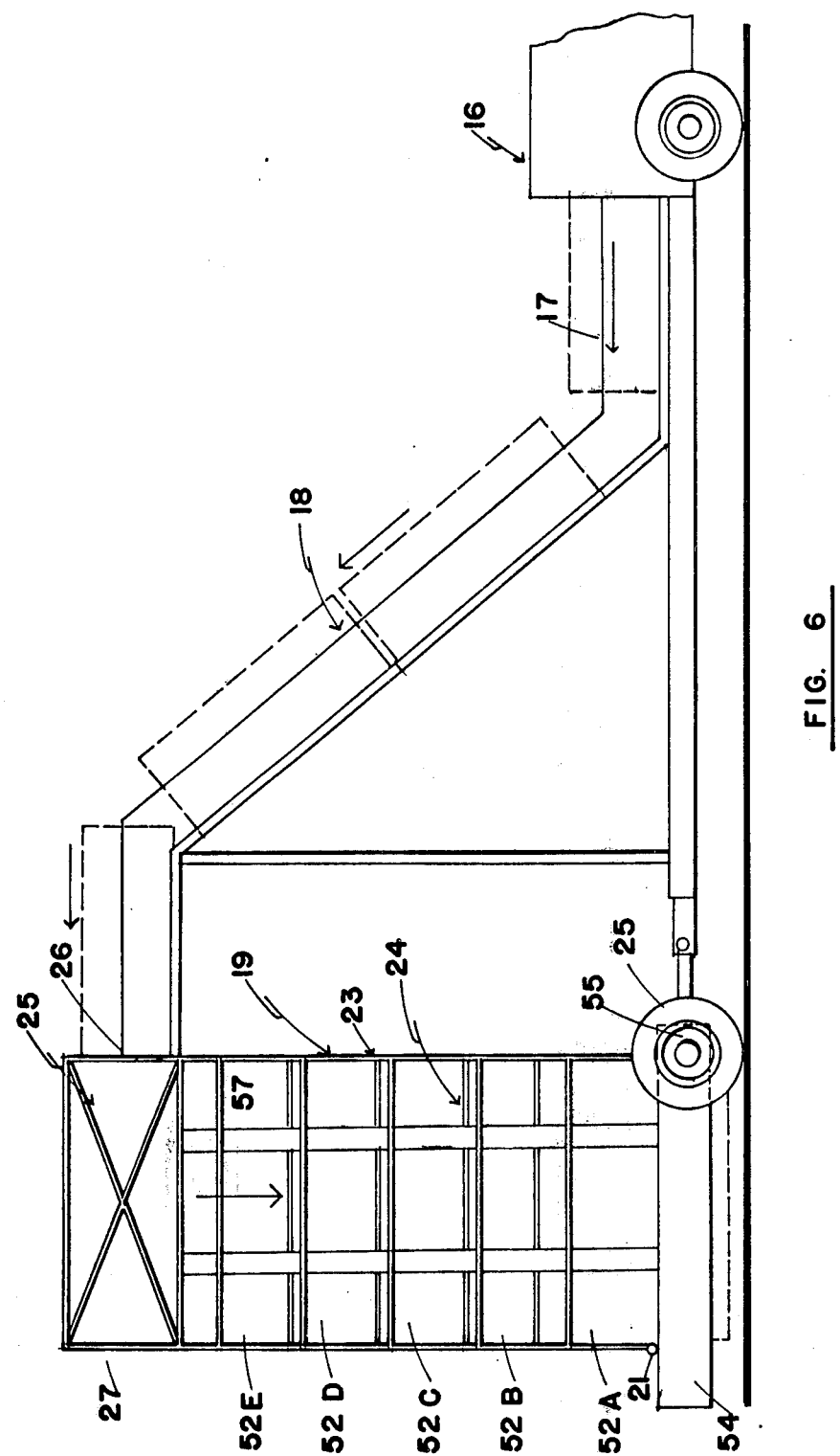
FIG. 6 is a partially schematic side elevation of the device shown in conjunction with a baler and conveyor also shown schematically.

Dealing next with FIG. 6, reference character 16 illustrates schematically a conventional baling machine which deposits bales rearwardly onto platform 17. A conventional conveyor collectively designated 18 picks up bales from the platform 17 and elevates them upwardly to the upper side of the bale stacking machine collectively designated 19.

This bale stacking machine is constructed of substantially tubular members and includes a framework generally designated 20 which includes transverse members 21, tubular frame members 22 forming bale receiving chutes as will hereinafter be described, and frame members 23 forming a transfer chute collectively designated 24.

Ground engaging wheels 25 are journalled for rotation upon axles 26 which in turn are supported by end frame members 27 in the conventional manner.

Alternatively, of course, skids (not illustrated) may be provided.

The dimensions of the machine when viewed in side elevation as illustrated in FIG. 6, are substantially equal to the length of a conventional bale, namely, 3 feet thus making a fairly compact device for operation and also for storage.

A substantially cubical chamber collectively designated 25 is provided at the upper end of the bale stacking machine and includes an open or entry end 26 and a closed end 27 situated at the rear of the machine. This chamber is formed by various tubular members including diagonal bases 28.

The base of the chamber 25 is provided by a substantially rectangular outlet gate collectively designated 29. This gate includes ribs 30 for assisting the sliding of bales thereon and is hinged to one longitudinal side 30 of the base of the chamber, by means of hinge pins 31.

This gate is normally urged to the closed position by means of coil springs 32 surrounding the hinge pin 31 and reacting between the frame 30 and the gate 29 although other methods of spring mounting may, of course, be utilized.

The outlet gate 29 is normally urged to the closed position by springs 32 as hereinbefore described and maintained in this position by means of a latch mechanism collectively designated 33.

Figure 5:
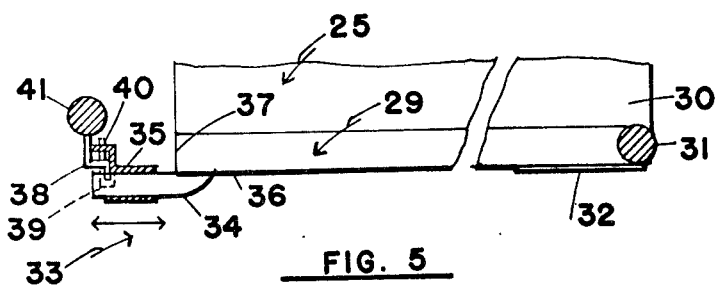
FIG. 5 is an enlarged fragmentary view of the latch mechanism per se.

Details of the latch mechanism are shown in FIG. 5 and consist of at least one sliding latch 34 mounted for sliding movement within a casing 35 and normally engaging the underside 36 of the edge 37 of the gate 29.

An angulated link 38 engages a slot 39 within the distal end of the latch 34 and this link is pivoted on pin 40 as shown and is capable of partial rotation around this pin 40 thus withdrawing latch 34 from the gate 36 or returning the latch to the position illustrated in FIG. 5.

Figure 2:
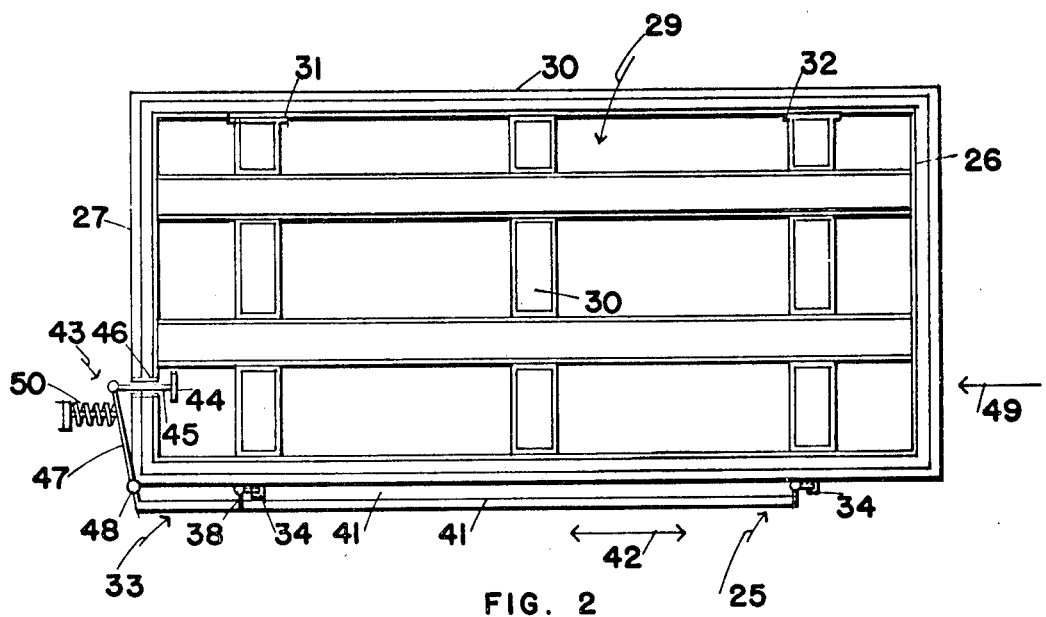
FIG. 2 is a partially schematic top plan view of the bale receiving chamber per se.
Figure 4:
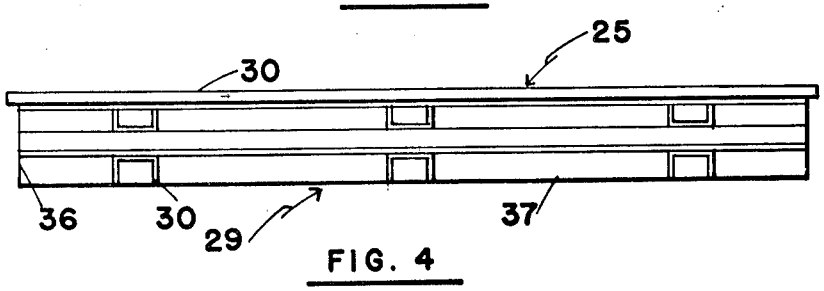
FIG. 4 is a view at right angles to FIG. 3.
Figure 3:
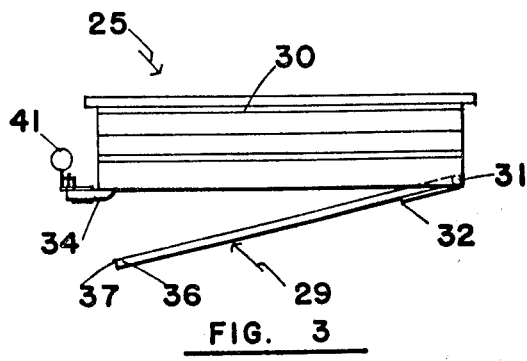
FIG. 3 is an end view of FIG. 2.

An actuating rod 41 is secured to the upper end of link 38 and this in turn is end shifted in the direction of double headed arrow 42 by means of an actuator assembly collectively designated 43 and shown in FIG. 2.

A plate member 44 is secured to one end of a rod 45 which is journalled for end shifting movement within bearing sleeve 46 at the closed end 27 of the chamber. Rod 45 is pivoted to link 47 which in turn is connected to one end of rod 41. Link 47 is pivoted intermediate the ends thereof at point 48.

A bale enters the chamber from the conveyor 18 moving in the direction of arrow 49 and is urged into the chamber by the next succeeding bale. The configuration of the chamber straightens the bale and as it moves towards the closed end, it strikes the member 44 and actuates the trip mechanism which releases the outlet gate 29 which then swings downwardly due to the weight of the bale thereon. As soon as the bale clears the outlet gate as will hereinafter be described, springs 32 return the gate to the closed position which is then latched by latch 34. The latch mechanism is returned to the gate receiving position by means of a compression spring 50 mounted in the usual way as shown in FIG. 2.

Although one latch and release mechanism has been described and illustrated, nevertheless it will be appreciated that many other forms of latching may be used without altering the scope or function of the instant device.

The aforementioned transfer chute 24 is formed on one side of the supporting framework and inclines downwardly and away from the base of the chamber 25.

The transfer chute includes the side frame members 51 with the upper side being open if desired.

A plurality of bale receiving chutes 52A, B, C, D and E are formed in the supporting framework and extend in an inclined position, substantially at right angles to the longitudinal axis of the transfer chute indicated by reference character 53.

These bale receiving chutes are also formed from tubular members and are provided with bases upon which bales may slide downwardly to the lower ends of these bale receiving chutes which are defined by a plurality of spaced and parallel bale receiving forks 54. These forks are pivoted to the base of the framework for example, as illustrated by pivot point 55 and normally are in the horizontal position substantially parallel to the ground. However, conventional means are provided to enable these bale forks to trip so that the distal ends pivot downwardly and engage the ground so that the pile of bales supported by these forks may be withdrawn from the forks and deposited upon the ground as hereinbefore described.

Many different methods are well known for tripping bale forks to deposit bales upon the ground, such methods either being automatically actuated or manually actuated as desired.

However, as these methods are well known as hereinbefore mentioned, it is not believed necessary to describe same further.

It will be noted that the bale forks 54 are provided adjacent the junctions of the lower ends of adjacent bale receiving chute so that bales sliding down these chutes as will hereinafter be described, engage the bale forks with one longitudinal corner 55 extending there below and these corners, of course, engage the ground as clearly shown in FIG. 7.

Figure 1:
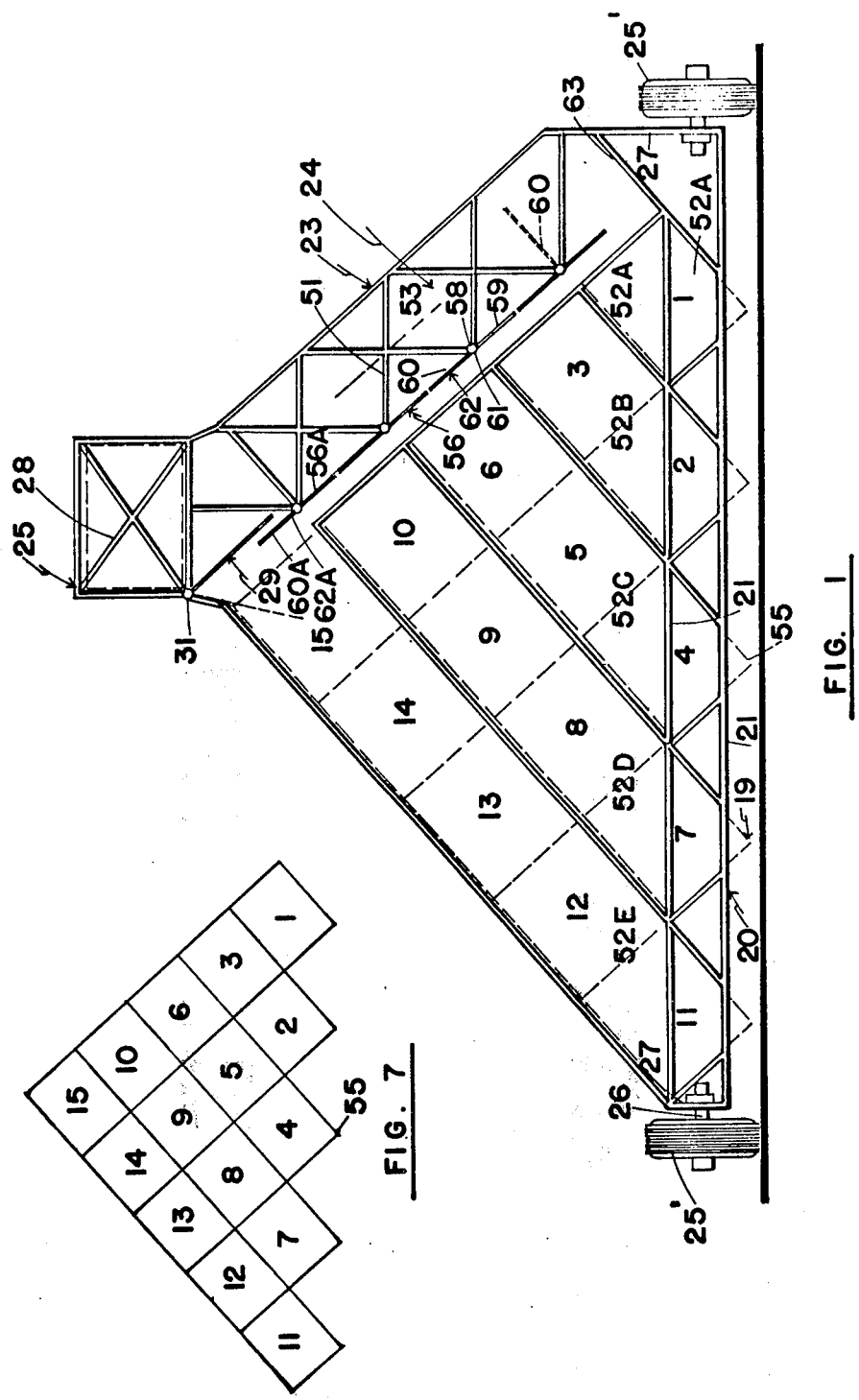
FIG. 1 is a rear partially schematic view of the bale stacking machine.

Due to the angle of inclination of the chutes as clearly shown in FIG. 1, chute 52A is dimensioned to receive one bale 52B to receive two bales, 52C to receive three bales, 52D to receive four bales, and 52E to receive five bales.

A plurality of chute gates collectively designated 56 are provided which, when closed, from the base of the transfer chute 24. Each of these chute gates 56 is substantially rectangular when viewed in plan and is provided with a plurality of ribs 57 (see FIG. 6) to facilitate the sliding of bales by gravity thereover.

Each chute gate is pivoted transversely intermediate the ends thereof to the sides of the transfer chute, reference character 58 indicating the pivots. These pivots divide each gate into a front portion 59 and a rear portion 60, the front portion being forwardly of the pivot and the rear portion being rearwardly thereof.

When mounted in position as shown in FIG. 1 the front portion 59 of each gate covers approximately half of the entrance to one individual bale receiving chute 52 and the rear portion covers approximately half of the entrance of the next adjacent bale receiving chute and spring means 61 are provided around the pivots 58 to urge the gates to the closed position illustrated in FIG. 1. This position is maintained by means of stops 62 formed on the side of the frames against which the gates engage so that the gates can only pivot in one direction and against the force of the springs 61.

The gates are positioned as illustrated in FIG. 1 with the rear portion 60A of the uppermost gate specifically designated 56A partially extending over the entrance to the longest bale receiving chute 52A and it will be observed that this gate is maintained in position by means of the stop specifically designated 62A. This means that as the outlet gate 29 is released and moves downwardly around hinges 31 due to the weight of the bale thereon, it swings into position upon the rear portion 60A and completes the floor of the transfer chute 24.

This gate 29 which has been released by the bale striking the member 44 as hereinbefore described, then slides across the gates 56 by gravity facilitated by the ribs 57. Due to the movement of the bale, it spans the junction between adjacent gates without tripping same until it reaches the front portion of the lowermost gate partially covering the entrance to the chute 52A. It strikes the rear wall 63 of the transfer chute and as all of the bale is on the front portion of this particular gate, the weight of the bale swings the gate downwardly, pivots the bale and deposits same within chute 52A upon the bale forks at the base thereof.

Due to the dimensions of chute 52A, the upper rear corner of the bale holds the gate in the open position with the front portion 59 against the rear wall of the chute as shown in phantom in FIG. 1. This means that the rear portion 60 extends upwardly across the transfer chute and acts as a barrier, the gate having swung through approximately 90°.

The outlet gate 29 has of course returned to the closed position and is released by the next succeeding bale entering the chamber, once again the outlet gate opens and the bale slides down the transfer chute across the gates until it strikes the upstanding portion 60 of the lowermost gate. The bale is then dropped into the second chute 52B opening the next succeeding gate and this bale slides down chute 52B upon the bale forks 54. As this particular chute is longer than chute 52A the upper rear corner of the bale clears the front edge of the front portion of the gate thus allowing spring 61 to return the gate to the original closed position illustrated. The third bale, however, tips this gate again and is deposited within chute 52B upon the first bale therein. This next bale holds this particular gate open so that the rear portion thereof acts as a barrier to the next bale sliding down the transfer chute and which is then deposited at the base of the bale receiving chute 52C. The operation is repeated until 52C is full whereupon its gate is held at right angles and the bale is then deposited within chute 52D. When chute 52D is full, gate 56A is held in the open position by the uppermost bale thus allowing the next bale to swing the outlet gate 29 through to the fully open position so that bales now start sliding into chute 52E. The bales in this particular chute are tipped as they enter the chute due to the fact that it is below the outlet gate. This ensures that the outer row consisting of bales 11 through 15 are tipped so that the string side is on the outside thus assisting in the shedding of water from the pile of bales. When this chute is full, the bale forks are tripped as hereinbefore mentioned thus depositing the pile of bales upon the ground behind the device.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A bale stacker for use in conjunction with a baler and a conveyor receiving bales from said baler and transferring same to said bale stacker; said bale stacker comprising in combination supporting framework, ground engaging means on each side of said framework, for facilitating the movement of said stacker along the ground, a bale receiving chamber formed on the upper side of said framework and receiving bales one at a time from the associated conveyor, an outlet gate hingedly mounted in the base of said chamber and forming said base, trip means actuated by the particular bale in said chamber to release said outlet gate, means to return said outlet gate to the closed position after said bale has passed therethrough, an inclined transfer chute extending from below said chamber downwardly and outwardly therefrom, a plurality of bale receiving chutes extending from the base of said transfer chute and being situated in side by side relationship substantially at right angles to the longitudinal axis of said transfer chute, bale receiving forks at the bases of said bale receiving chutes, and automatically opening chute gates forming the base of said transfer chute, said chute gates including spring means normally urging the chute gates to the closed position the weight of a bale thereon opening said chute gates against the pressure of said spring means.

2. The bale stacker according to claim 1 in which said chute gates in said transfer chute are substantially rectangular when viewed in plan, said chute gates being pivoted to the sides of said transfer chute, intermediate the ends of said chute gates whereby each of said chute gates, when closed, partially extends over the entrance to two adjacent bale receiving chutes and form the floor of said transfer chute, and stop means maintaining said chute gates in the floor forming position when closed, said chute gates swinging through approximately 90° when fully open.

3. The bale stacker according to claim 2 in which said chute gates include a forward portion forwardly of the pivotal mounting thereof and a rear portion rearwardly of the pivotal mounting thereof, said rear portion partially closing off one bale receiving chute, said front portion partially closing off the adjacent bale receiving chute, said front portion swinging downwardly against the upper side wall of said adjacent bale receiving chute, said rear portion swinging upwardly across said transfer chute thereby closing off said transfer chute when in the open position, the uppermost bale in said adjacent bale receiving chute, holding said chute gate in the open position when said adjacent chute is full.

4. The bale stacker according to claim 1 in which said outlet gate is hingedly secured to one longitudinal side of said bale receiving chamber, said outlet gate swinging downwardly into overlapping relationship with the chute gate adjacent thereto, when said chute gate is in the closed position.

5. The bale stacker according to claim 2 in which said outlet gate is hingedly secured to one longitudinal side of said bale receiving chamber, said outlet gate swinging downwardly into overlapping relationship with the chute gate adjacent thereto, when said chute gate is in the closed position.

6. The bale stacker according to claim 3 in which said outlet gate is hingedly secured to one longitudinal side of said bale receiving chamber, said outlet gate swinging downwardly into overlapping relationship with the rear portion of the chute gate adjacent thereto, when said chute gate is in the closed position.

7. The bale stacker according to claim 1 in which said bale receiving chamber includes an entry end and a closed end, said trip means including a spring loaded member mounted for sliding movement in the closed end and normally extending into said chamber, one end of the associated bale engaging said member, at least one latch normally holding said outlet gate in the closed position, and linkage means operatively connected between said member and said latch for releasing said latch when the associated bale engages said member as aforesaid, said means to return said outlet gate to the closed position comprising spring means operatively extending between said outlet gate and the framework forming said bale receiving chamber and normally urging said outlet gate towards the closed position.

8. The bale stacker according to claim 2 in which said bale receiving chamber includes an entry end and a closed end, said trip means including a spring loaded member mounted for sliding movement in the closed end and normally extending into said chamber, one end of the associated bale engaging said member, at least one latch normally holding said outlet gate in the closed position, and linkage means operatively connected between said member and said latch for releasing said latch when the associated bale engages said member as aforesaid, said means to return said outlet gate to the closed position comprising spring means operatively extending between said outlet gate and the framework forming said bale receiving chamber and normally urging said outlet gate towards the closed position.

9. The bale stacker according to claim 3 in which said bale receiving chamber includes an entry end and a closed end, said trip means including a spring loaded member mounted for sliding movement in the closed end and normally extending into said chamber, one end of the associated bale engaging said member, at least one latch normally holding said outlet gate in the closed position, and linkage means operatively connected between said member and said latch for releasing said latch when the associated bale engages said member as aforesaid, said means to return said outlet gate to the closed position comprising spring means operatively extending between said outlet gate and the framework forming said bale receiving chamber and normally urging said outlet gate towards the closed position.

10. The bale stacker according to claim 4 in which said bale receiving chamber includes an entry end and a closed end, said trip means including a spring loaded member mounted for sliding movement in the closed end and normally extending into said chamber, one end of the associated bale engaging said member, at least one latch normally holding said outlet gate in the closed position, and linkage means operatively connected between said member and said latch for releasing said latch when the associated bale engages said member as aforesaid, said means to return said outlet gate to the closed position comprising spring means operatively extending between said outlet gate and the framework forming said bale receiving chamber and normally urging said outlet gate towards the closed position.

11. The bale stacker according to claim 5 in which said bale receiving chamber includes an entry end and a closed end, said trip means including a spring loaded member mounted for sliding movement in the closed end and normally extending into said chamber, one end of the associated bale engaging said member, at least one latch normally holding said outlet gate in the closed position, and linkage means operatively connected between said member and said latch for releasing said latch when the associated bale engages said member as aforesaid, said means to return said outlet gate to the closed position comprising spring means operatively extending between said outlet gate and the framework forming said bale receiving chamber and normally urging said outlet gate towards the closed position.

* * * * *